United States Patent
Xu et al.

(10) Patent No.: US 11,057,746 B2
(45) Date of Patent: Jul. 6, 2021

(54) METHOD, DEVICE AND SYSTEM FOR TRANSMITTING BROADCASTING SERVICES, AND COMPUTER STORAGE MEDIUM

(71) Applicant: ZTE CORPORATION, Shenzhen (CN)

(72) Inventors: Hui Xu, Shenzhen (CN); Zijiang Ma, Shenzhen (CN); Zhendong Li, Shenzhen (CN); Bhalla Rajesh, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 266 days.

(21) Appl. No.: 16/301,157

(22) PCT Filed: Jan. 11, 2017

(86) PCT No.: PCT/CN2017/070909
§ 371 (c)(1),
(2) Date: Jul. 9, 2019

(87) PCT Pub. No.: WO2017/193623
PCT Pub. Date: Nov. 16, 2017

(65) Prior Publication Data
US 2019/0364392 A1    Nov. 28, 2019

(30) Foreign Application Priority Data

May 13, 2016   (CN) .......................... 201610323454.1

(51) Int. Cl.
*H04W 4/06*   (2009.01)
*H04W 76/15*   (2018.01)
(Continued)

(52) U.S. Cl.
CPC ............... *H04W 4/06* (2013.01); *H04W 4/40* (2018.02); *H04W 76/15* (2018.02); *H04W 84/042* (2013.01)

(58) Field of Classification Search
CPC ... H04W 4/06; H04W 4/40–46; H04W 76/11; H04W 76/40; H04W 84/042
See application file for complete search history.

(56) References Cited

U.S. PATENT DOCUMENTS

2015/0119023 A1*   4/2015   Wang .................. H04W 72/005
                                                            455/432.1
2015/0304122 A1*   10/2015   Pazos .................. H04L 61/2069
                                                            370/312
2019/0124489 A1*   4/2019   Ahmad .................... H04W 4/40

FOREIGN PATENT DOCUMENTS

CN            1635817 A        7/2005

OTHER PUBLICATIONS

WIPO, International Search Report dated Mar. 1, 2017 corresponding to application No. PCT/CN2017/070909.
(Continued)

*Primary Examiner* — Pao Sinkantarakorn
(74) *Attorney, Agent, or Firm* — Morgan, Lewis & Bockius LLP (57) ABSTRACT

The present invention provides a method, device and system for transmitting broadcasting services, and a computer storage medium. The method comprises: a network side network element obtains user service description (USD) information in a plurality of PLMNs; the network side network element transmits the USD information to a user equipment (UE), wherein the USD information is used for instructing the UE to obtain required broadcasting services in the plurality of PLMNs.

20 Claims, 4 Drawing Sheets (51) Int. Cl.
*H04W 4/40* (2018.01)
*H04W 84/04* (2009.01)

(56) References Cited

OTHER PUBLICATIONS

European Patent Office, Extended European Search Report dated May 16, 2019 corresponding to European application No. 17795250.4.
3rd Generation Partnership Project; Technical Specification Group Services and System Aspects; Study on architecture enhancements for LTE support of V2X services; Apr. 19, 2016.

* cited by examiner

METHOD, DEVICE AND SYSTEM FOR TRANSMITTING BROADCASTING SERVICES, AND COMPUTER STORAGE MEDIUM

TECHNICAL FIELD

The disclosure relates to the field of communication, and particularly to a method, device and system for broadcast service transmission and a computer storage medium.

BACKGROUND

For effectively utilizing mobile network resources, the 3rd Generation Partnership Project (3GPP) proposes a multimedia broadcast multicast service (MBMS). This service is a technology for sending data from a data source to multiple target mobile terminals, implements sharing of a network (including core network and access network) resource and increases a utilization rate of the network resource.

Figure 1:
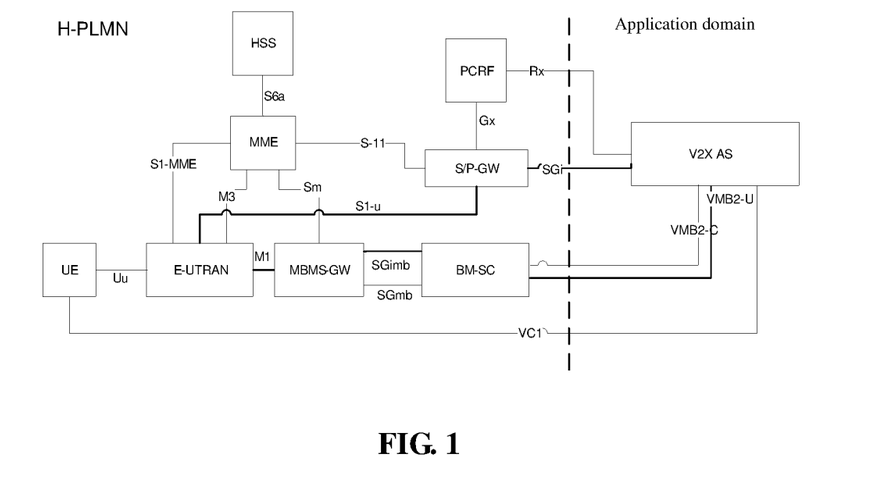
FIG. 1 is a schematic diagram of an MBMS-based V2X system architecture according to the related art.

The 3GPP proposes a research subject about a single-cell MBMS in Long Term Evolution-Advanced (LTE-A) Release 13 (R13). The single-cell MBMS is transmitted on a Physical Downlink Shared Channel (PDSCH). In a 3GPP network, an MBMS is identified with a Temporary Mobile Group Identity (TMGI) and the TMGI is allocated by a broadcast multicast-service centre (BM-SC). An application server (AS) notifies a user equipment (UE) of related service description information, for example, the TMGI and a service starting time, through application-layer signaling. single-cell point-to-multipoint (SC-PTM) is another method for transmitting a broadcast service on a PDSCH. A multimedia broadcast single frequency network (MBSFN) and the SC-PTM have a same core network, and a Multicell/Multicast Coordination Entity (MCE) at an access network determines to adopt the MBSFN or SC-PTM to send a broadcast service through an air interface. A traffic safety service is usually intended for multiple vehicles in a certain area, an efficient method is to adopt broadcast transmission for downlink. Simulation evaluation shows that adopting unicast transmission for downlink hardly meets a capacity requirement of a vehicle to everything (V2X) service. If a vehicle sending a V2X service moves fast, a service area or cell may frequently change. If the vehicle (or UE) enters an MBMS service area, user service description (USD) information is desired to be read at first, such USD including a content such as a service identifier, a deployment frequency, a starting/ending time and the service area. The UE determines a desired V2X service according to the content of the USD, then monitors control information of the desired V2X service and reads the desired V2X service. FIG. 1 is a schematic diagram of an MBMS-based V2X system architecture according to the related art. In the system architecture shown in FIG. 1, a V2X service is transmitted through an MBMS.

Different operating companies may deploy their own MBMS networks and there may be one or more V2X ASs. At present, the 3GPP makes such a requirement that UE may receive a V2X service of another operating company, namely receiving data in a different Public Land Mobile Network (PLMN). However, at present, an LTE MBMS does not support roaming, namely the UE may not receive an MBMS of another PLMN except a serve PLMN. That is, when multiple PLMNs provide V2X services in an area where the UE is located, the UE may not receive the V2X service in a non-serve PLMN.

For the problem in the related art, there is yet no effective solution at present.

SUMMARY

Embodiments of the disclosure provide a method, device and system for broadcast service transmission and a computer storage medium, so as to at least solve the problem in the related art that, when multiple PLMNs provide broadcast services in an area where UE is located, the UE may not receive the broadcast service in a non-serve PLMN.

According to an aspect of the embodiments of the disclosure, a method for broadcast service transmission is provided, which may include that: a network-side network element acquires USD information of multiple PLMNs; and the network-side network element sends the USD information to UE, the USD information being arranged to indicate a desired broadcast service, to be acquired by the UE, in the multiple PLMNs.

In the embodiments of the disclosure, the network-side network element may include at least one of: an AS or a BM-SC.

In the embodiments of the disclosure, the network-side network element is the AS, the method may further include that: the network-side network element establishes an MBMS bearer in the multiple PLMNs.

In the embodiments of the disclosure, the AS includes a single AS, and the operation that the network-side network element establishes the MBMS bearer in the multiple PLMNs may include that: for a same broadcast service, the network-side network element establishes a respective MBMS bearer in each of the PLMNs; or, for the same broadcast service, the network-side network element establishes an MBMS bearer in a PLMN corresponding to the broadcast service, the MBMS bearer including at least one of: an MBSFN bearer or an SC-PTM bearer.

In the embodiments of the disclosure, the operation that the network-side network element acquires the USD information of the multiple PLMNs may include that: the network-side network element selects all or part of the acquired USD information; and the network-side network element determines new USD information according to the selected USD information, the new USD information being information related to broadcast services to be received in the multiple PLMNs, in the USD information acquired by the AS, or the new USD information being information related to broadcast services to be USD information of any of the multiple PLMNs, in which USD information of one or more other PLMNs has been added.

In the embodiments of the disclosure, the operation that the network-side network element sends the USD information to the UE may include that: the network-side network element sends the new USD information to the UE.

In the embodiments of the disclosure, when the network-side network element is the AS and the ASs includes multiple ASs, the method may further include that: any of the multiple ASs acquires the USD information of the PLMNs where the other ASs are located through interfaces therebetween or BM-SCs in the multiple PLMNs acquire the USD information of the other PLMNs through interfaces therebetween.

In the embodiments of the disclosure, the operation that the network-side network element establishes the MBMS bearer in the multiple PLMNs may include that: the network-side network element establishes a respective MBMS bearer in each of the PLMNs, or establishes an MBMS bearer in a PLMN, to which network-side network element belongs.

In the embodiments of the disclosure, the operation that the network-side network element acquires the USD information of the multiple PLMNs may include that: any of the multiple ASs or any BM-SC in the multiple PLMNs selects all or part of the acquired USD information; and any of the multiple ASs or any BM-SC in the multiple PLMNs determines new USD information according to the selected USD information, the new USD information being information related to broadcast services to be received in the multiple PLMNs, in the USD information acquired by the AS, or the new USD information being information related to broadcast services to be USD information of any of the multiple PLMNs, in which USD information of one or more other PLMNs has been added.

In the embodiments of the disclosure, the operation that the network-side network element sends the USD information to the UE may include that: any of the multiple ASs or any BM-SC in the multiple PLMNs sends the new USD information.

In the embodiments of the disclosure, the multiple ASs or the BM-SCs in the multiple PLMNs have interfaces arranged to transmit broadcast service information to one another.

In the embodiments of the disclosure, the method may further include that: the ASs or the BM-SCs in the multiple PLMNs generate the USD information to be received in the multiple PLMNs and send the USD information to the corresponding UE; and the ASs or the BM-SCs acquire the USD information and key information corresponding to the broadcast service in different PLMNs and send the USD information and the key information to the corresponding UE.

In the embodiments of the disclosure, the AS may be a V2X AS; and the broadcast service may be a V2X service.

In the embodiments of the disclosure, the operation that the network-side network element establishes the MBMS bearer may be executed before or after the operation that the network-side network element sends the USD information.

According to another aspect of the embodiments of the disclosure, a method for broadcast service transmission is provided, which may include that: UE receives USD information sent by a network-side network element, the USD information being all or part of USD information of multiple PLMNs; and the UE acquires a desired broadcast service according to the received USD information.

According to another aspect of the embodiments of the disclosure, a device for broadcast service transmission is provided, which may be applied to a network-side network element and include: a first acquisition module, arranged to acquire USD information of multiple PLMNs; and a sending module, arranged to send the USD information to a UE, the USD information being arranged to indicate a desired broadcast service, to be acquired by the UE, in the multiple PLMNs.

In the embodiments of the disclosure, the network-side network element may include at least one of: an AS or a BM-SC.

In the embodiments of the disclosure, when the network-side network element is an AS, the device may further include an establishment module applied to an AS side, and the establishment module may be arranged to establish an MBMS bearer in the multiple PLMNs.

In the embodiments of the disclosure, the AS includes a single AS, the establishment module may include: a first establishment unit, arranged to, for a same broadcast service, establish a respective MBMS bearer in each of the PLMNs; or, a second establishment unit, arranged to, for the same broadcast service, only establish an MBMS bearer in a PLMN corresponding to the broadcast service, the MBMS bearer including at least one of: an MBSFN bearer or an SC-PTM bearer.

In the embodiments of the disclosure, the first acquisition module may include: a first selection unit, arranged to select all or part of USD information from the acquired USD information; and a first determination unit, arranged to determine new USD information according to the selected USD information, the new USD information being information related to broadcast services to be received in the multiple PLMNs, in the USD information acquired by the AS, or the new USD information being information related to broadcast services to be USD information of any of the multiple PLMNs, in which USD information of one or more other PLMNs has been added.

In the embodiments of the disclosure, the sending module may further be arranged to send, by the network-side network element, the new USD information to the UE.

In the embodiments of the disclosure, when the network-side network element is an AS and there are multiple such ASs, the device may further include a second acquisition module applied to any of the multiple ASs, and the second acquisition module may be arranged to acquire the USD information of the PLMNs where the other ASs are located through interfaces therebetween or acquire, by BM-SCs in the multiple PLMNs, the USD information of the other PLMNs through interfaces therebetween.

In the embodiments of the disclosure, the establishment module applied to any AS side in the multiple ASs may further include a third establishment unit, arranged to establish a respective MBMS bearer in each of the PLMNs or establish an MBMS bearer in the PLMN to which the device belongs.

In the embodiments of the disclosure, the first acquisition module may be applied to a side of any of the multiple ASs or a side of any BM-SC in the multiple PLMNs, and the first acquisition module may include: a second selection unit, arranged to select all or part of USD information from the acquired USD information; and a second determination unit, arranged to obtain new USD information according to the selected USD information, the new USD information being information related to broadcast services to be received in the multiple PLMNs, in the USD information acquired by the AS, or the new USD information being information related to broadcast services to be USD information of any of the multiple PLMNs, in which USD information of one or more other PLMNs has been added.

In the embodiments of the disclosure, the sending module may be applied to the side of any of the multiple ASs or the side of any BM-SC in the multiple PLMNs, and the sending module may further be arranged to send the new USD information.

In the embodiments of the disclosure, the multiple ASs or the BM-SCs in the multiple PLMNs have interfaces arranged to transmit broadcast service information to one another.

In the embodiments of the disclosure, the network-side network element is the AS, the device may further include: a processing module, arranged to generate the USD information to be received in the multiple PLMNs and send the USD information to the corresponding UE, and a third acquisition module, arranged to acquire key information corresponding to the broadcast service in the different PLMNs and send the key information to the corresponding UE; or, when the network-side network element is the BM-SC, the device may further include a fourth acquisition module, arranged to acquire key information corresponding to the broadcast service and the USD information in the different PLMNs and send the key information and the USD information to the corresponding UE.

In the embodiments of the disclosure, the AS may be a V2X AS; and the broadcast service may be a V2X service.

In the embodiments of the disclosure, the operation that the establishment module establishes the MBMS bearer may be executed before or after the operation that the sending module sends the USD information.

According to another aspect of the embodiments of the disclosure, a device for broadcast service transmission is provided, which may be applied to a UE side and include: a receiving module, arranged to receive USD information sent by a network-side network element, the USD information being all or part of USD information of multiple PLMNs; and a fifth acquisition module, arranged to acquire a desired broadcast service according to the received USD information.

According to another aspect of the embodiments of the disclosure, a system for broadcast service transmission is provided, which may include the device applied to a network-side network element side and the device applied to the UE side.

According to another aspect of the embodiments of the disclosure, a computer storage medium is provided, the computer storage medium provided in the embodiments of the disclosure storing a computer program and the computer program being arranged to execute the method for broadcast service transmission.

With adoption of the technical solutions of the embodiments of the disclosure, the network-side network element may send the acquired USD information of the multiple PLMNs to the UE, so as for the UE to acquire information about the desired broadcast service in the multiple PLMNs. Therefore, the problem in the related art that, when multiple PLMNs provide broadcast services in an area where UE is located, the UE may not receive the broadcast service in a non-serve PLMN is solved.

BRIEF DESCRIPTION OF DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

The disclosure will be described below with reference to the drawings and in combination with the embodiments in detail. It is to be noted that the embodiments in the application and characteristics in the embodiments may be combined without conflicts.

It is to be noted that terms "first", "second" and the like in the specification, claims and drawings of the disclosure are adopted not to describe a specific sequence or order but to distinguish similar objects.

Embodiment One

Figure 2:
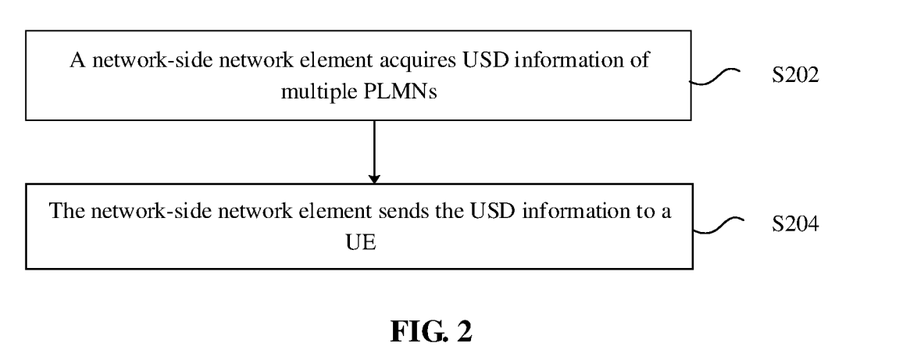
FIG. 2 is a first flowchart of a method for broadcast service transmission according to an embodiment of the disclosure.

The embodiment provides a method for broadcast service transmission. FIG. 2 is a first flowchart of a method for broadcast service transmission according to an embodiment of the disclosure. As shown in FIG. 2, the flow includes the following steps.

In S202, a network-side network element acquires USD information of multiple PLMNs.

In S204, the network-side network element sends all or part of the acquired USD information to UE.

All or part of the USD information includes the USD information of the PLMN to which the UE belongs, and the USD information of the PLMNs to which the UE does not belong. The USD information is arranged to indicate a desired broadcast service, to be acquired by the UE, in the multiple PLMNs.

From S202 and S204 of the embodiment, it can be seen that the network-side network element may send the acquired USD information of the multiple PLMNs to the UE, so as for the UE to acquire information about the desired broadcast service in the multiple PLMNs. Therefore, the problem in the related art that, when multiple PLMNs provide V2X services in an area where UE is located, the UE may not receive the V2X service in a non-serve PLMN is solved.

It is to be noted that the network-side network element involved in the embodiment includes at least one of: an AS or a BM-SC.

The disclosure will be described below with the AS and the BM-SC as examples.

On the basis of the above descriptions, when the network-side network element is an AS, the method of the embodiment may further include that: the network-side network element establishes an MBMS bearer in the multiple PLMNs.

It is to be noted that the operation that the network-side network element establishes the MBMS bearer is executed before or after the operation that the network-side network element sends the USD information.

However, in the embodiment, when the network-side network element is an AS, the number of the AS may be one or more. Descriptions will be made below for the two cases respectively.

A first case: the network-side network element is an AS and there is one such AS.

The following manner may be adopted for the operation, involved in the embodiment, that the network-side network element establishes the MBMS bearer through BM-SCs in the PLMNs: for the same broadcast service, the AS establishes a respective MBMS bearers in each of different PLMNs; or, for the same broadcast service, the AS merely establishes an MBMS bearer in a PLMN corresponding to the broadcast service, the MBMS bearer including at least one of: an MBSFN bearer or an SC-PTM bearer.

In an optional implementation mode of the embodiment, the following manner may be adopted for the operation, involved in S202 of the embodiment, that the network-side network element acquires the USD information of the multiple PLMNs.

In S202-1, the network-side network element selects all or part of the acquired USD information.

In S202-2, the network-side network element determines new USD information according to the selected USD information, the new USD information being information related to broadcast services to be received in the multiple PLMNs, in the USD information acquired by the AS, or the new USD information being information related to broadcast services to be USD information of any of the multiple PLMNs, in which USD information of one or more other PLMNs has been added.

On such a basis, the following manner may be adopted for the operation, involved in S204 of the embodiment, that the network-side network element sends all or part of acquired USD information to the UE: the network-side network element sends the new USD information to the UE.

A second case: when the network-side network element is an AS and there are multiple such ASs, the network-side network element is applied to a side of any of the multiple ASs and the method of the embodiment includes that: the USD information of the PLMNs where the other ASs are located is acquired through interfaces therebetween, or the BM-SCs in the multiple PLMNs acquire the USD information of the other PLMNs through interfaces therebetween.

In the embodiment, the network-side network element may establish the MBMS bearer through the BM-SCs in the multiple PLMNs in the following manner: MBMS bearers are established in all the PLMNs respectively or an MBMS bearer is established in the PLMN to which the network-side network element belongs.

On such a basis, the following manner may be adopted for the operation, involved in S202 of the embodiment, that the network-side network element acquires the USD information of the multiple PLMNs.

In S202-3, any of the multiple ASs or any BM-SC in the multiple PLMNs selects all or part of the acquired USD information.

In S202-4, new USD information is determined according to the selected USD information, the new USD information being information related to broadcast services to be received in the multiple PLMNs, in the USD information acquired by the AS, or the new USD information being information related to broadcast services to be USD information of any of the multiple PLMNs, in which USD information of one or more other PLMNs has been added.

The operation, involved in S204 of the embodiment, that the network-side network element sends all or part of acquired USD information to the UE includes that: the any of the multiple ASs or any BM-SC in the multiple PLMNs sends the new USD information.

It is to be noted that the multiple ASs or the BM-SCs in the multiple PLMNs have interfaces arranged to transmit broadcast service information to one another.

The method in the embodiment may further include that: the ASs or the BM-SCs in the multiple PLMNs generate the USD information to be received in the multiple PLMNs and send it to the corresponding UE; and the ASs or the BM-SCs acquire key information corresponding to the broadcast service and the USD information in different PLMNs and send them to the corresponding UE.

Embodiment Two

Figure 3:
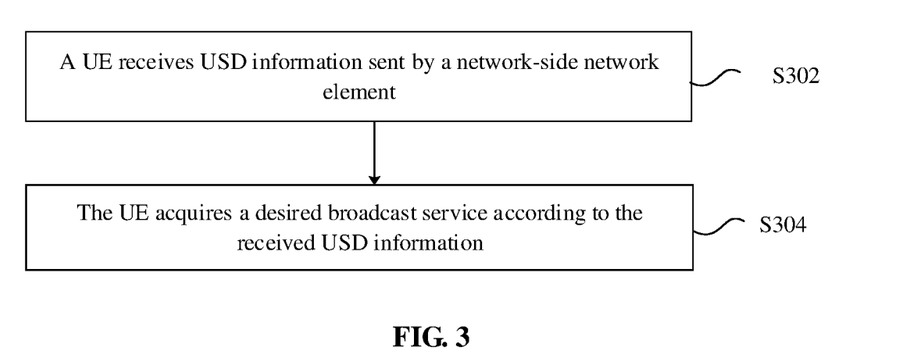
FIG. 3 is a second flowchart of a method for broadcast service transmission according to an embodiment of the disclosure.

FIG. 3 is a second flowchart of a method for broadcast service transmission according to an embodiment of the disclosure. As shown in FIG. 3, the method includes the following steps.

In S302, UE receives USD information and key information corresponding to broadcast services in multiple PLMNs from a network-side network element, the USD information being all or part of USD information of the multiple PLMNs.

In S304, the UE acquires a desired broadcast service according to the received USD information and key information.

From the above descriptions about the implementation modes, those skilled in the art may clearly know that the method according to the abovementioned embodiments may be implemented in a manner of combining software and a necessary universal hardware platform, and of course, may also be implemented through hardware, but the former is a preferred implementation mode under many circumstances. Based on such an understanding, the technical solutions of the disclosure substantially or parts making contributions to the conventional art may be embodied in form of software product, and the computer software product is stored in a storage medium (for example, a Read-Only Memory (ROM)/Random Access Memory (RAM), a magnetic disk and an optical disk), including a plurality of instructions arranged to enable a computer device (which may be a personal computer, a server, a network device or the like) to execute the method in each embodiment of the disclosure.

Embodiment Three

The embodiment further provides a device for broadcast service transmission, which is arranged to implement the abovementioned embodiments and preferred implementation modes. What has been described will not be elaborated. For example, term "module", used below, may be a combination of software and/or hardware capable of realizing a preset function. Although the devices described in the following embodiment are preferably implemented with software, implementation with hardware or a combination of the software and the hardware is also possible and conceivable.

Figure 4:
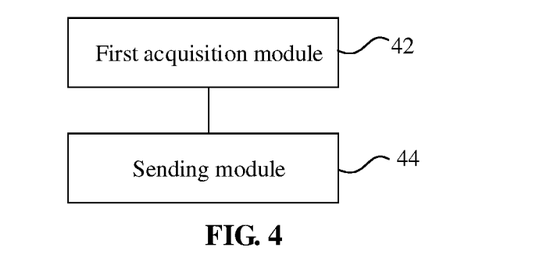
FIG. 4 is a first structure block diagram of a device for broadcast service transmission according to an embodiment of the disclosure.

FIG. 4 is a first structure block diagram of a device for broadcast service transmission according to an embodiment of the disclosure. The device is applied to a network-side network element. As shown in FIG. 4, the device includes: a first acquisition module 42, arranged to acquire USD information of multiple PLMNs; and a sending module 44, coupled to the first acquisition module 42 and arranged to send the USD information to UE, the USD information being arranged to indicate information about a desired broadcast service, to be acquired by the UE, in the multiple PLMNs.

It is to be noted that the network-side network element includes at least one of: an AS or a BM-SC.

On such a basis, optionally, when the network-side network element is an AS, the device further includes an establishment module applied to an AS side, and the establishment module is arranged to establish an MBMS bearer in the multiple PLMNs.

A first case: there is only one AS.

The establishment module includes: a first establishment unit, arranged to, for the same broadcast service, establish a respective MBMS bearer in each of the different PLMNs; or, a second establishment unit, arranged to, for the same broadcast service, merely establish an MBMS bearer in a PLMN corresponding to the broadcast service, the MBMS bearer including at least one of: an MBSFN bearer or an SC-PTM bearer.

Optionally, the first acquisition module includes: a first selection unit, arranged to select all or part of the acquired USD information; and a first determination unit, arranged to determine new USD information according to the selected USD information, the new USD information being information related to broadcast services to be received in the multiple PLMNs, in the USD information acquired by the AS, or the new USD information being information related to broadcast services to be USD information of any of the multiple PLMNs, in which USD information of one or more other PLMNs has been added.

Optionally, the sending module is further arranged to send, by the network-side network element, the new USD information to the UE.

A second case: the network-side network element is multiple ASs.

The device further includes a second acquisition module applied to any of the multiple ASs, and the second acquisition module is arranged to acquire the USD information of the PLMNs where the other ASs are located through interfaces therebetween or acquire, by BM-SCs in the multiple PLMNs, the USD information of the other PLMNs through interfaces therebetween.

Optionally, the establishment module applied to a side of any of the multiple ASs further includes a third establishment unit, arranged to establish a respective MBMS bearer in each of the PLMNs or establish an MBMS bearer in a PLMN, to which the network-side network element belongs.

Optionally, the first acquisition module is applied to a side of any of the multiple ASs or a side of any BM-SC in the multiple PLMNs, and the first acquisition module includes: a second selection unit, arranged to select all or part of the acquired USD information; and a second determination unit, arranged to obtain new USD information according to the selected USD information, the new USD information being information related to broadcast services to be received in the multiple PLMNs, in the USD information acquired by the AS, or the new USD information being information related to broadcast services to be USD information of any of the multiple PLMNs, in which USD information of one or more other PLMNs has been added.

Optionally, the sending module is applied to a side of any of the multiple ASs or a side of any BM-SC in the multiple PLMNs, and the sending module is further arranged to send the new USD information.

Optionally, the multiple ASs or the BM-SCs in the multiple PLMNs have interfaces arranged to transmit broadcast service information to one another.

Optionally, when the network-side network element is an AS, the device further includes: a processing module, arranged to interact with each BM-SC in the multiple PLMNs to generate the USD information to be received in the multiple PLMNs and send it to the corresponding UE; and a third acquisition module, arranged to acquire key information corresponding to the broadcast service in different PLMNs and send it to the corresponding UE.

In addition, when the network-side network element is a BM-SC, the device further includes a fourth acquisition module, arranged to acquire the USD information and key information corresponding to the broadcast service in different PLMNs and send them to the corresponding UE.

It is to be noted that the AS is a V2X AS and the broadcast service is a V2X service. In addition, the establishment module establishes the MBMS bearer before or after the sending module sends the USD information.

During a practical application, all of functions realized by each unit in the device for broadcast service transmission may be realized by a Central Processing Unit (CPU), or Micro Processor Unit (MPU), or Digital Signal Processor (DSP), or Field Programmable Gate Array (FPGA) and the like in the device for broadcast service transmission.

Embodiment Four

Figure 5:
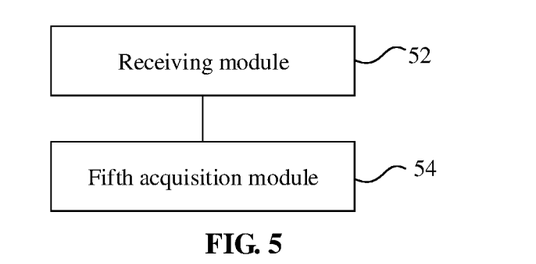
FIG. 5 is a second structure block diagram of a device for broadcast service transmission according to an embodiment of the disclosure.

FIG. 5 is a second structure block diagram of a device for broadcast service transmission according to an embodiment of the disclosure. The device is applied to a UE side. As shown in FIG. 5, the device includes: a receiving module 52, arranged to receive USD information and key information corresponding to broadcast services in multiple PLMNs from a network-side network element, the USD information being all or part of USD information of the multiple PLMNs; and a fifth acquisition module 54, coupled to the receiving module 52 and arranged to acquire a desired broadcast service according to the received USD information and key information.

It is to be noted that each of the abovementioned modules may be implemented through software or hardware and the latter condition may be implemented in, but not limited to, the following manner: all of the modules are located in the same processor or each module is freely combined for location in different processors respectively.

Embodiment Five

Figure 6:
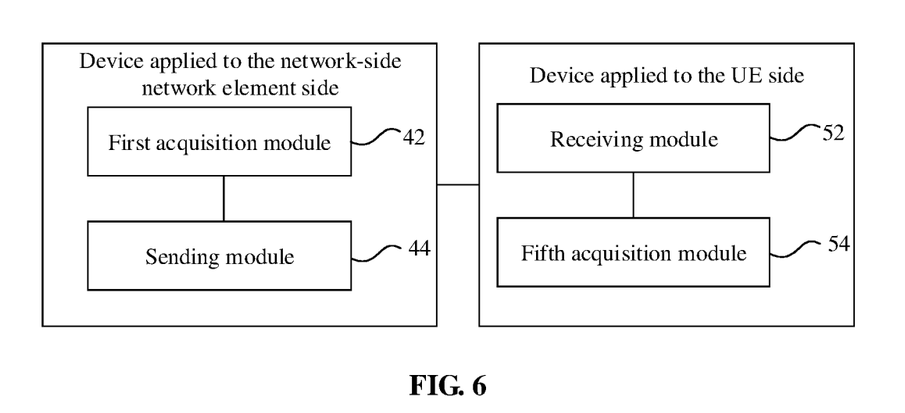
FIG. 6 is a structure block diagram of a system for broadcast service transmission according to an embodiment of the disclosure.

FIG. 6 is a structure block diagram of a system for broadcast service transmission according to an embodiment of the disclosure. As shown in FIG. 6, the system includes the device of embodiment three and the device of embodiment four.

It is to be noted that a broadcast service involved in embodiments one to five may refer to digital video, Machine Type Communication (MTC), Public Safety (PS) communication, Internet Of Thing (IOT), Mission Critical Push To Talk (MCPTT) and V2X services in the related art. Of course, different broadcast services are required to correspond to different servers. For example, when the broadcast service is a V2X service, the corresponding server is a V2X server.

V2X refers to providing vehicle information through a sensor, vehicle-mounted terminal and electronic tag loaded on a vehicle, adopting various communication technologies to implement Vehicle to Vehicle (V2V), Vehicle to Pedestrian (V2P) and Vehicle to Infrastructure (V2I) interconnection and intercommunication, effectively utilizing the information on an information network platform by extraction, sharing and the like, effectively controlling the vehicle and providing integrated services. A Road Side Unit (RSU) may receive a request of a vehicle and ensure access of the vehicle to the Internet and has a function of a gateway. In addition, it also has data operation, storage and forwarding functions.

At present, there are two V2X implementation technologies in the related art: Dedicated Short Range Communication (DSRC) and LTE. DSRC is based on a series of standards of IEEE802.11P and IEEE1609. 802.11P is responsible for a physical layer and Media Access Control (MAC) technology and 1609 is responsible for an upper-layer specification. Discussions about an LTE-based V2X technology are just started and there is no standard yet.

Figure 7:
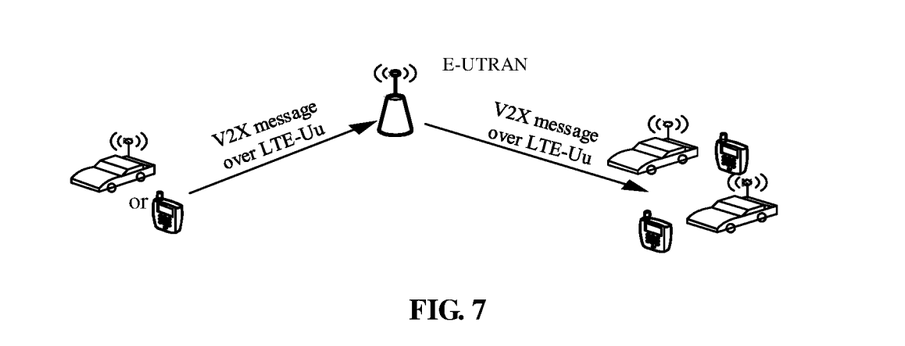
FIG. 7 is a schematic diagram of an architecture transmitting a V2X service through a Uu interface according to the related art.

An LTE V2X technology that the 3GPP is discussing includes that: an RSU may be implemented through static UE or Evolved Node B (eNB) and V2V/V2I/V2P may be implemented through a PC5 interface or a Uu interface, the PC5 interface referring to a Device to Device (D2D) air interface and the Uu interface referring to an air interface from the UE to the eNB. FIG. 7 is a schematic diagram of an architecture transmitting a V2X service through a Uu interface according to the related art. The system architecture sending the V2X service through the Uu interface is shown in FIG. 7.

Figure 8A:
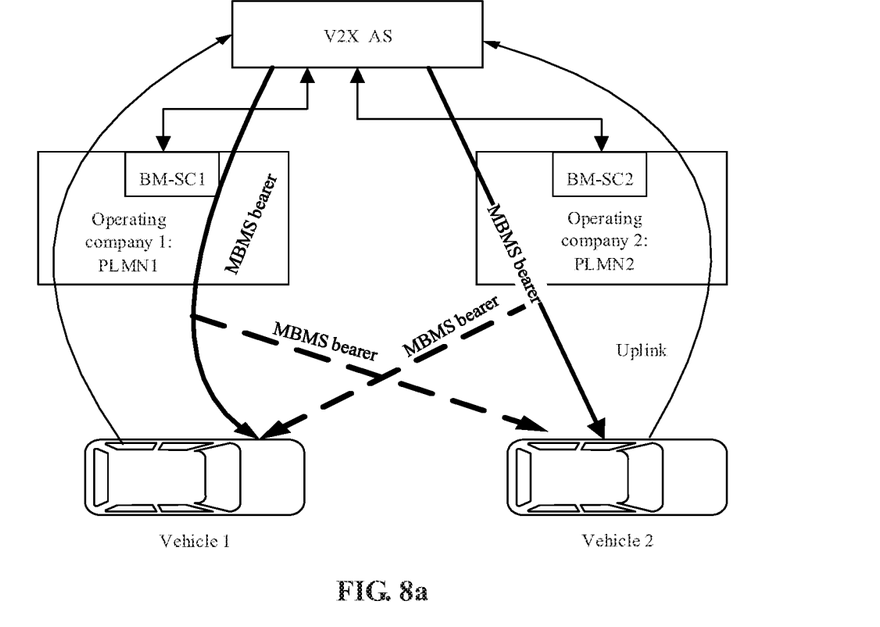
FIG. 8*a* is a schematic diagram of a multi-operating-company-single-AS scenario according to an embodiment of the disclosure.
Figure 8B:
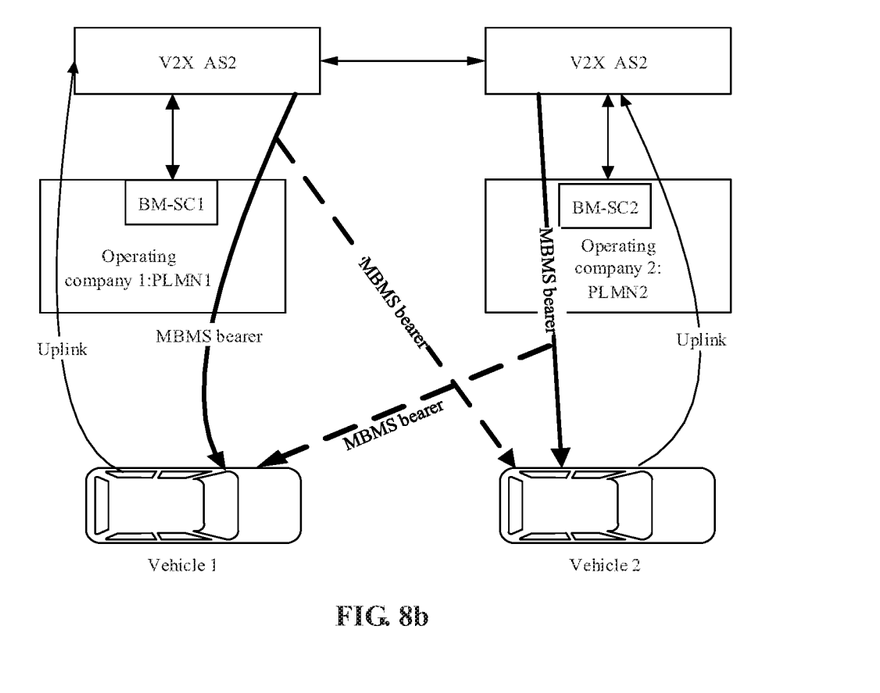
FIG. 8*b* is a schematic diagram of a multi-operating-company-multi-AS scenario according to an embodiment of the disclosure.

Embodiments one to five will be illustrated below in combination with FIG. 8a and FIG. 8b and embodiment six to embodiment ten with a V2X service as an example. FIG. 8a is a schematic diagram of a multi-operating-company-single-AS scenario according to an embodiment of the disclosure. FIG. 8b is a schematic diagram of a multi-operating-company-multi-AS scenario according to an embodiment of the disclosure.

Embodiment Six

The embodiment provides a method for V2X information transmission with a single V2X AS as an example. In the embodiment, for the same V2X service, a respective MBMS bearer may be established in each PLMN.

The method of the embodiment includes the following steps.

In S401, the AS establishes a respective MBMS bearer in each of the different PLMNs.

The AS receives V2X information sent by UE in different PLMNs. The AS determines to establish the MBMS bearers in different PLMNs according to the received V2X information, an operating company strategy, an Operation, Administration and Maintenance (OAM) solution or the like. The MBMS bearers correspond to the V2X information in multiple PLMNs. That is, each MBMS bearer is arranged to transmit a V2X service in the multiple PLMNs.

For example, if the AS receives a V2X service 1 of a PLMN1, the AS establishes MBMS bearers TMGI1 and TMGI2 for transmitting the received V2X service 1 in the PLMN1 and a PLMN2 respectively. Similarly, if the AS receives a V2X service 2 of the PLMN2, the AS establishes MBMS bearers TMGI3 and TMGI4 for transmitting the received V2X service 2 in the PLMN1 and the PLMN2 respectively.

Therefore, the AS may interact with a BM-SC in each PLMN to, for example, request for a desired TMGI, establish/activate an MBMS bearer and etc.

In S502, the AS instructs BM-SCs to send USD information.

The BM-SCs send corresponding USDs in the PLMNs where they belong respectively. A piece of USD includes, but not limited to, a TMGI, a frequency, a service starting, time, a service ending time and a Service Area Identifier (SAI).

In S503, UE receives the USD information.

The UE receives the USD of the PLMN where it belongs and determines a desired V2X service according to the USD information.

In S504, the UE monitors V2X control information.

The UE monitors control information corresponding to the desired V2X service.

In S505, the UE receives desired V2X service data.

The UE receives the desired V2X service data according to the control information of the desired V2X service.

Embodiment Seven

The embodiment provides a method for V2X information transmission with a single V2X AS as an example. In the method, for the same V2X service, a single MBMS bearer is established.

The method includes the following steps.

In S601, the V2X AS establishes the MBMS bearer for the V2X service.

The V2X AS receives V2X information sent by UE in different PLMNs. The AS requests to establish the MBMS bearer. The MBMS bearer is only established in the corresponding PLMN. If the AS receives V2X information 1 of a PLMN1, an MBMG bearer TMGI1 for transmitting the V2X information 1 is established in the PLMN1. If the AS receives V2X information 2 of a PLMN2, an MBMS bearer TMGI2 for transmitting the V2X information 2 is established in the PLMN2.

In S602, BM-SCs send USDs.

The BM-SCs send the USDs in the PLMNs to which they belong respectively. It is to be noted that the V2X AS is required to acquire USD information in different PLMNs, for example, a USD1 of the PLMN1 and a USD2 of the PLMN2, through the corresponding BM-SCs. The ASS processes the received USD1 and USD2 to, for example, form a new USD3 or an updated USD1/USD2. The USD3 may be a USD shared by the multiple PLMNs. That is, the USD3 includes information of a V2X service to be received by the UE in the multiple PLMNs. Or, the updated USD1/USD2 includes two parts of information: one is information shared by different PLMNs, i.e., information of a V2X service to be received by the UE in different PLMNs, and the other is exclusive MBMS service information in different PLMNs.

The BM-SC in the PLMN1 sends the USD1 and the USD3 and the BM-SC in the PLMN2 sends the USD2 and the USD3. Or the BM-SC in the PLMN1 sends the updated USD1 and the BM-SC in the PLMN2 sends the updated USD2.

A specific USD content and sending may be processed according to an indication of the AS.

In S603, UE receives the USDs.

The UE receives the USDs and determines a desired V2X service. For example, the UE determines the desired V2X service according to the USD3 or the updated USD1/USD2.

In S604, the UE monitors control information corresponding to the desired V2X service.

The UE monitors the control information of the desired V2X service according to the determined desired V2X service.

In S605, the UE acquires desired V2X service data.

The V2X AS sends the corresponding V2X service through MBMS bearers in different PLMNs and the UE needs to receive the desired V2X service data in the other PLMNs. If the UE is provided with two receivers, different receivers may be adopted to receive the desired V2X services in different PLMNs. For decrypting the V2X service data in a non-serve PLMN, the UE requests the AS for a key and the AS interacts with the related BM-SC to acquire the key required by the UE and sends it to the UE. Furthermore, the AS may interact with the BM-SC to authenticate the UE, namely determining whether the UE is allowed to receive the V2X service of the non-serve PLMN or not.

Embodiment Eight

The embodiment provides a method for V2X information transmission with multiple V2X ASs as an example. In the method, for the same V2X service, a respective MBMS bearer may be established in each PLMN.

The method of the embodiment includes the following steps.

In S701, the V2X ASs interact about V2X service information through interfaces.

There is made such a hypothesis that an AS1 is located in a PLMN1, an AS2 is located in a PLMN2 and an interface exists between the AS1 and the AS2.

The AS1 and the AS2 receive V2X data sent by UE in the PLMN1 and the PLMN2 respectively. The AS1 and the AS2 interact about the received V2X data through the interface.

In S702, the ASs request to establish the MBMS bearers.

The ASs establish the MBMS bearers in PLMNs to which they belong respectively. For example, the AS1 establishes an MBMS bearer TMGI1 in the PLMN1 and the AS2 establishes an MBMS bearer TMGI2 in the PLMN2. The TMGI1 or the TMGI2 is arranged to transmit V2X services in the PLMN1 and the PLMN2. That is, the V2X services transmitted through the TMGI1 or the TMGI2 include a V2X service 1 in the PLMN1 and a V2X service 2 in the PLMN2.

In S703, BM-SCs send USDs.

The BM-SCs send the USDs in the PLMNs. For example, a BM-SC1 sends a USD1 and a BM-SC2 sends a USD2. The USD1 or the USD2 includes related information about the corresponding V2X services in the PLMN1 and the PLMN2.

In S704, UE monitors control information of a desired V2X service according to the USDs.

The UE receives the USDs and determines the desired V2X service according to contents of the USDs. The UE monitors the control information of the desired V2X service in the PLMN to which the UE belongs.

In S705, the UE receives the desired V2X service.

The UE receives the desired V2X service in the PLMN to which the UE belongs. The V2X service includes related V2X services in the multiple PLMNs. That is, the V2X services in the multiple PLMNs are sent through the MBMS in the PLMN where the UE is located.

Embodiment Nine

The embodiment provides a method for V2X information transmission with multiple V2X ASs as an example. In the embodiment, for the same V2X service, a single MBMS bearer is established.

The method includes the following steps.

In S801, the V2X ASs acquire USD information.

The ASs acquire the USD information in PLMNs to which they belong through BM-SCs. For example, an AS1 acquires a USD1 of a PLMN1 and an AS2 acquires a USD2 of a PLMN2.

In S802, the ASs interact about the USD information through interfaces.

The ASs acquire the USD information of the other PLMNs through the interfaces. The ASs, after acquiring the USD information of the other PLMNs, send the USD information related to the V2X service in the other PLMNs to the BM-SCs in the PLMNs to which they belong and instruct the BM-SCs to send the related USD information, the related USD information referring to USD information corresponding to the V2X service to be received by the UE in the multiple PLMNs. Specifically, two implementation manners may be adopted. 1) A new USD is generated and sent in different PLMNs respectively, the new USD including information of a V2X service to be received in the multiple PLMNs and the new USD being the same for the multiple PLMNs. 2) An existing USD is modified and the USD information of another PLMN is added thereto, the added USD information referring to USD information corresponding to the V2X service to be received in the multiple PLMNs.

In S803, BM-SCs send USDs.

The BM-SCs generate the USDs according to S802 and send them in different PLMNs. For example, a BM-SC1 sends an original USD1 and a new USD3 or sends a new USD1 in the PLMN1.

In S804, the UE monitors control information of a desired V2X service.

In S805, the UE receives the desired V2X service.

The ASs establish the corresponding MBMS bearers in different PLMNs. For example, the AS1 receives a V2X service 1 sent by UE1 in the PLMN1 and the AS2 receives a V2X service 2 sent by UE2 in the PLMN2. The AS1 establishes an MBMS bearer TMGI1 corresponding to the V2X service 1 in the PLMN1 and, similarly, the AS2 establishes a TMGI2 in the PLMN2. In such case, the TMGI1 and the TMGI2 are indicated in the USD of the PLMN1 and also indicated in the USD of the PLMN2.

If the UE is provided with two receivers, the desired V2X services are received in the PLMN1 and the PLMN2 respectively. For acquiring a V2X service key in a non-serve PLMN, the UE may send a request to the corresponding AS, the AS requests another AS through an interface, the another AS acquires the corresponding key and authentication information of the UE through the BM-SC and sends them to the requesting AS, and the requesting AS sends the key to the UE.

For a UE with a single receiver, a serve eNB of the UE may be requested for a gap, the gap being arranged to receive the desired V2X service in the other PLMNs. Or the UE selects to receive a high-priority service according to priorities of different services. The UE may further receive the desired V2X service through an opportunity in Discontinuous Reception (DRX), if the priority of the desired V2X service is relatively low.

Embodiment Ten

Figure 9:
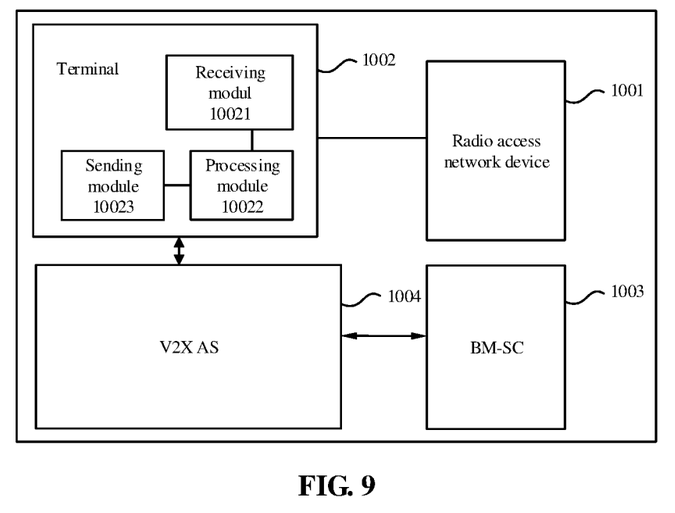
FIG. 9 is a structure block diagram of a system for V2X information transmission according to an embodiment of the disclosure.

The embodiment provides a system for V2X information transmission. FIG. 9 is a structure block diagram of a system for V2X information transmission according to an embodiment of the disclosure. As shown in FIG. 9, the system includes a radio access network device 1001, a terminal 1002, a BM-SC 1003 and a V2X AS 1004. The terminal 1002 includes a terminal receiving module 10021, a processing module 10022 and a sending module 10023. The terminal receiving module 10021 is arranged to receive V2X service control information and a V2X service sent by the radio access network device 1001 through an air interface. The processing module 10022 of the terminal 1002 is arranged to determine a desired V2X service according to received USD information. The sending module 10023 of the terminal 1002 is arranged to send a V2X key request message to the V2X AS 1004. The BM-SC 1003 is arranged to interact with the V2X AS 1004 to generate the USD information. The V2X AS 1004 is arranged to acquire, through the BM-SC, and send, to the BM-SC, the USD information and is further arranged to acquire V2X related information through an interface between ASs.

The embodiment of the disclosure further provides a computer storage medium. Optionally, in the embodiment, the computer storage medium may be arranged to store a program code arranged to execute the following steps.

In S1, a network-side network element acquires USD information of multiple PLMNs and key information corresponding to broadcast services in the multiple PLMNs.

In S2, the network-side network element sends all or part of the acquired USD information and key information to UE.

The USD information is arranged to indicate information about a desired broadcast service in the multiple PLMNs to be acquired by the UE through the key information. Optionally, in the embodiment, the storage medium may include, but not limited to: various media capable of storing program codes such as a U disk, a ROM, a RAM, a mobile hard disk, a magnetic disk or an optical disk.

Optionally, specific examples in the embodiment may refer to the examples described in the abovementioned embodiments and optional implementation modes and will not be elaborated in the embodiment.

The embodiment of the disclosure further provides a computer storage medium. Optionally, in the embodiment, the computer storage medium may be arranged to store a program code arranged to execute the following steps.

In S1, UE receives USD information and key information corresponding to broadcast services in multiple PLMNs from a network-side network element, the USD information being all or part of USD information of the multiple PLMNs.

In S2, the UE acquires a desired broadcast service according to the received USD information and key information.

Apparently, those skilled in the art should know that each module or each step of the disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

According to the technology of the embodiments of the disclosure, the network-side network element may send the acquired USD information of the multiple PLMNs to the UE, so as for the UE to acquire information about the desired broadcast service in the multiple PLMNs. Therefore, the problem in the related art that, when multiple PLMNs provide broadcast services in an area where UE is located, the UE may not receive the broadcast service in a non-serve PLMN is solved.

The invention claimed is:

1. A method for broadcast service transmission, comprising:
    acquiring, by a network-side network element, user service description (USD) information of multiple public land mobile networks (PLMNs); and
    sending, by the network-side network element, the USD information to a user equipment (UE),
    wherein the USD information is arranged to indicate one or more desired broadcast services, to be acquired by the UE, in the multiple PLMNs, the one or more desired broadcast services including a broadcast service in a non-serve PLMN, and the multiple PLMNs provide the one or more desired broadcast services in an area where the UE is located.

2. The method of claim 1, wherein the network-side network element comprises at least one of: an application server (AS) or a broadcast multicast-service centre (BM-SC).

3. The method of claim 2, wherein the network-side network element is the AS, and
    wherein the method further comprises:
    establishing, by the network-side network element, a multimedia broadcast multicast service (MBMS) bearer in the multiple PLMNs.

4. The method of claim 3, wherein the AS comprises a single AS, and
    wherein establishing, by the network-side network element, the MBMS bearer in the multiple PLMNs comprises:
    for a same broadcast service, establishing, the network-side network element, a respective MBMS bearer in each of the PLMNs; or,
    for the same broadcast service, establishing, by the network-side network element, an MBMS bearer in a PLMN corresponding to the broadcast service,
    wherein the MBMS bearer comprises at least one of: a multimedia broadcast single frequency network (MBSFN) bearer or a single-cell point-to-multipoint (SC-PTM) bearer.

5. The method of claim 3, wherein the network-side network element is the AS and the AS comprises multiple ASs, and
    wherein the method further comprises:
    acquiring, by any of the multiple ASs, the USD information of the PLMNs where other ASs are located through interfaces therebetween; or
    acquiring, by BM-SCs in the multiple PLMNs, the USD information of the other PLMNs through interfaces therebetween.

6. The method of claim 5, wherein establishing, by the network-side network element, the MBMS bearer in the multiple PLMNs comprises:
    by the network-side network element, establishing a respective MBMS bearer in each of the PLMNs, or establishing an MBMS bearer in a PLMN, to which network-side network element belongs.

7. The method of claim 5, wherein acquiring, by the network-side network element, the USD information of the multiple PLMNs comprises:

selecting, by any of the multiple ASs or any BM-SC in the multiple PLMNs, all or part of the acquired USD information; and determining, by any of the multiple ASs or any BM-SC in the multiple PLMNs, new USD information according to the selected USD information, the new USD information being information related to broadcast services to be received in the multiple PLMNs, in the USD information acquired by the AS or the new USD information being information related to broadcast services to be USD information of any of the multiple PLMNs, in which USD information of one or more other PLMNs has been added.

8. The method of claim 7, wherein sending, by the network-side network element, the USD information to the UE comprises:

sending, by any of the multiple ASs or any BM-SC in the multiple PLMNs, the new USD information.

9. The method of claim 3, wherein the network-side network element establishes the MBMS bearer before or after the network-side network element sends the USD information.

10. The method of claim 2, wherein acquiring, by the network-side network element, the USD information of the multiple PLMNs comprises:

selecting, by the network-side network element, all or part of the acquired USD information; and determining, by the network-side network element, new USD information according to the selected USD information, the new USD information being information related to broadcast services to be received in the multiple PLMNs, in the USD information acquired by the AS; or, the new USD information being USD information of any of the multiple PLMNs, in which USD information of one or more other PLMNs has been added.

11. The method of claim 10, wherein sending, by the network-side network element, the USD information to the UE comprises: sending, by the network-side network element, the new USD information to the UE.

12. The method of claim 2, further comprising:

by the AS or the BM-SCs in the multiple PLMNs, generating the USD information to be received in the multiple PLMNs and sending the USD information to the corresponding UE; and by the AS or the BM-SCs, acquiring key information corresponding to the broadcast service and the USD information in the different PLMNs and sending the key information and the USD information to the corresponding UE.

13. The method of claim 2, wherein the AS is a vehicle to everything (V2X) AS; and the broadcast service is a V2X service.

14. The method of claim 1, wherein the multiple ASs or the BM-SCs in the multiple PLMNs have interfaces arranged to transmit broadcast service information to one another.

15. A method for broadcast service transmission, comprising:

receiving, by a user equipment (UE), user service description (USD) information sent by a network-side network element, wherein the USD information is arranged to indicate one or more desired broadcast services including a broadcast service in a non-serve public land mobile networks (PLMN), to be acquired by the UE, in multiple PLMNs, the USD information being all or part of USD information of the multiple PLMNs, and the multiple PLMNs provide the one or more desired broadcast services in an area where the UE is located; and acquiring, by the UE, the one or more desired broadcast services according to the received USD information.

16. A network-side network element, comprising
a processor; and
a memory storing instructions, which, when executed by the processor, cause the processor to perform a method, comprising:

acquiring user service description (USD) information of multiple public land mobile networks (PLMNs); and sending the USD information to a user equipment (UE), wherein the USD information is arranged to indicate one or more desired broadcast services including broadcast service in a non-serve PLMN, to be acquired by the UE, in the multiple PLMNs, and the multiple PLMNs provide the one or more desired broadcast services in an area where the UE is located.

17. The network-side network element of claim 16, wherein the network-side network element comprises at least one of: an application server (AS) or a broadcast multicast-service centre (BM-SC).

18. The network-side network element of claim 17, wherein the network-side network element is the AS, and wherein the method further comprises:

establishing a multimedia broadcast multicast service (MBMS) bearer in the multiple PLMNs.

19. The network-side network element of claim 18, wherein the AS comprises a single AS, and wherein establishing the MBMS bearer in the multiple PLMNs comprises:

for a same broadcast service, establishing a respective MBMS bearer in each of the PLMNs; or, for the same broadcast service, establishing an MBMS bearer in a PLAIN corresponding to the broadcast service, wherein the MBMS bearer comprises at least one of: a multimedia broadcast single frequency network (MBSFN) bearer or a single-cell point-to-multipoint (SC-PTM) bearer.

20. The network-side network element of claim 17, wherein acquiring the USD information of the multiple PLMNs comprises:

selecting all or part of the acquired USD information; and determining new USD information according to the selected USD information, the new USD information being information related to broadcast services to be received in the multiple PLMNs, in the USD information acquired by the AS, or the new USD information being information related to broadcast services to be USD information of any of the multiple PLMNs, in which USD information of one or more other PLMNs has been added.

* * * * *